Dec. 20, 1949     C. H. JORGENSEN ET AL     2,491,497
ENGINE PRESSURE CONTROL SYSTEM
Filed Oct. 20, 1944     3 Sheets-Sheet 1
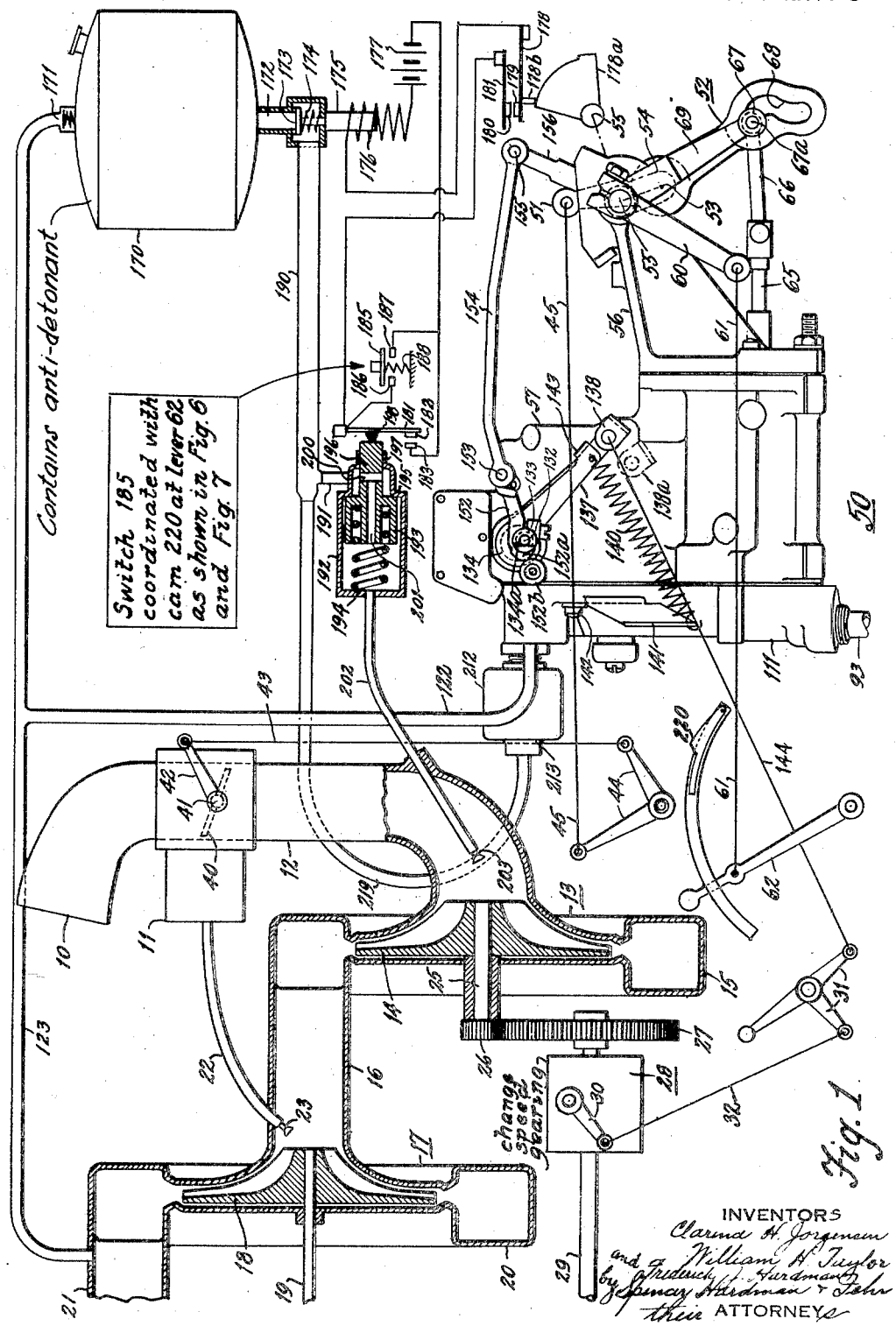

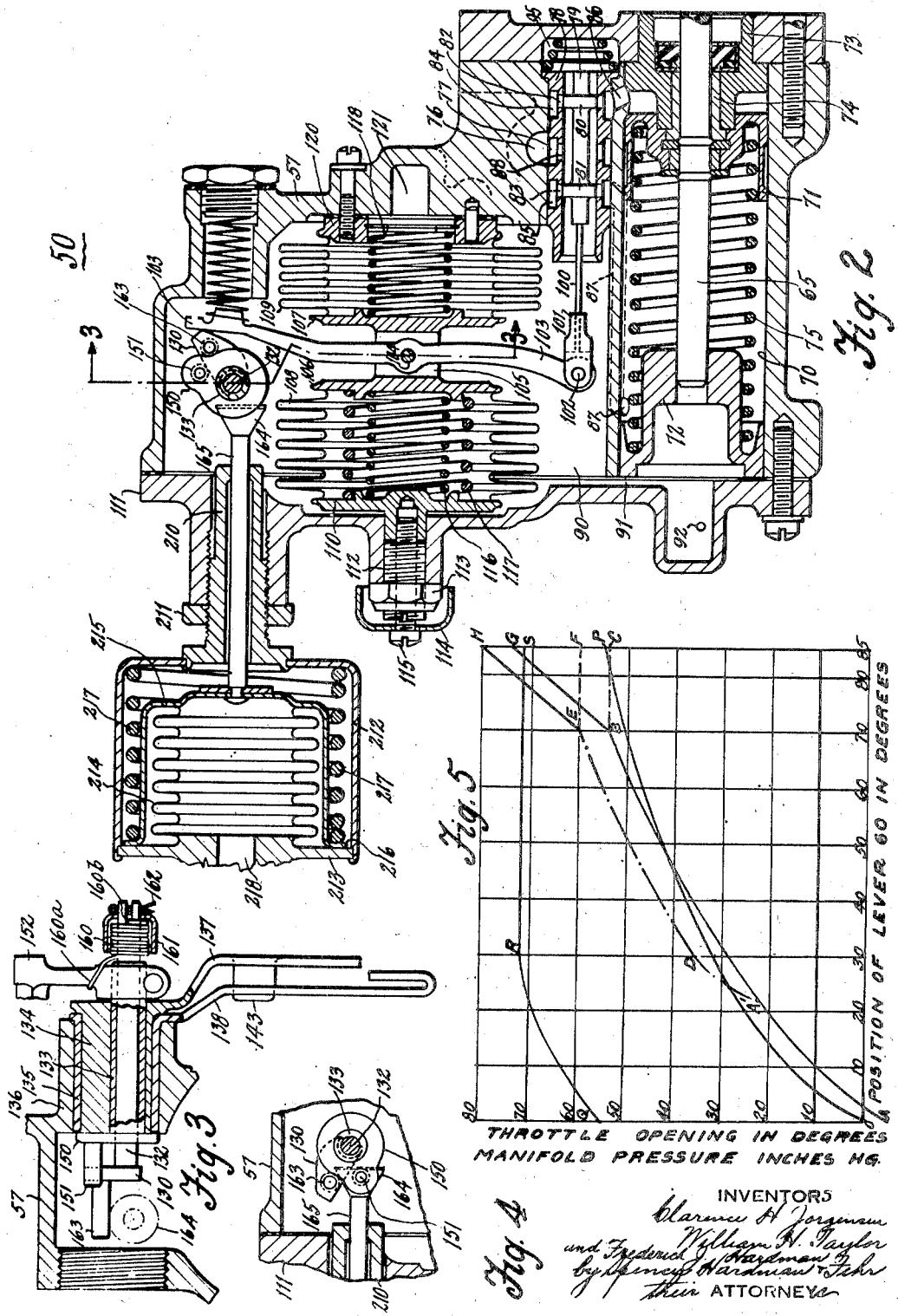

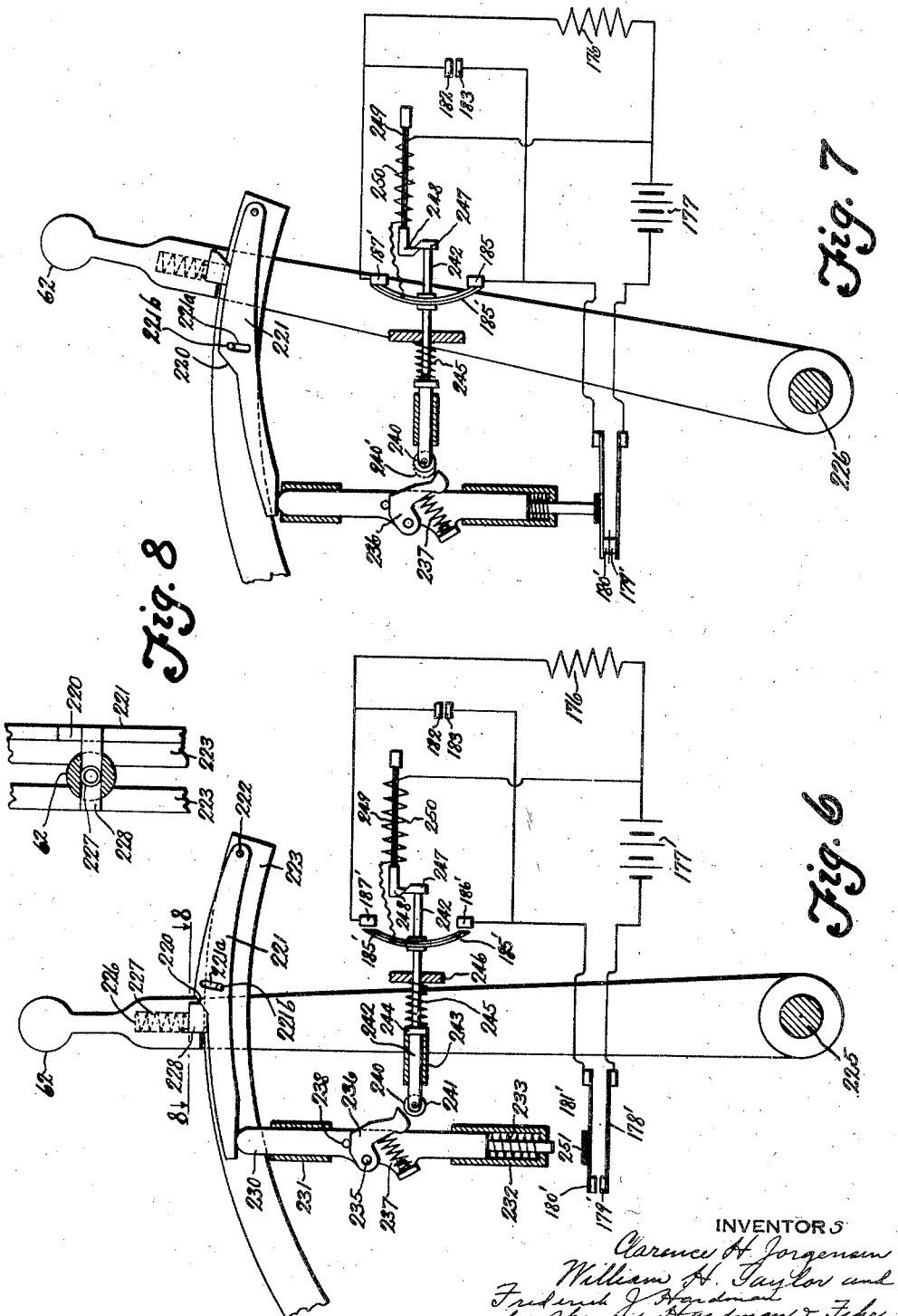

Patented Dec. 20, 1949

2,491,497

UNITED STATES PATENT OFFICE 2,491,497

ENGINE PRESSURE CONTROL SYSTEM

Clarence H. Jorgensen and William H. Taylor, Anderson, Ind., and Frederick J. Hardman, Dayton, Ohio, assignors to General Motors Corporation, Detroit, Mich., a corporation of Delaware Application October 20, 1944, Serial No. 559,519½

12 Claims. (Cl. 123—25)

This invention relates to the regulation of pressure in the manifold or intake of an airplane engine and more particularly to an engine having an engine-stage supercharger and an auxiliary supercharger driven by the engine through change speed gearing.

It is an object of the present invention to provide a system of control of manifold pressure comprising a throttle valve regulator which operates automatically to maintain a selected pressure and which is under joint control by the pilot's throttle lever and by a change speed gear lever and by means responsive to the operation of apparatus which injects a liquid, such as water-alcohol mixture, into the air intake passage leading to the engine manifold. The change from low speed drive to high speed drive of the auxiliary supercharger causes an increase of manifold pressure selection without requiring any change in the setting of the pilot's throttle lever. Manifold pressures which are safe for engine operation with water injection can be obtained only when water injection is operating. When water injection ceases, the manifold pressure is automatically reduced to a value for safe operation of the engine without water injection. Operation of the water injection apparatus will not occur until after the pilot's throttle lever has been moved into position for taking advantage of water injection by selecting high pressures in a range which can safely be maintained when water injection is used. When the lever is moved into positions for selecting pressures that are lower than said range, operation of the water injection apparatus ceases automatically.

Further objects and advantages of the present invention will be apparent from the following description, reference being had to the accompanying drawings wherein a preferred embodiment of the present invention is clearly shown.

In the drawings:

Fig. 1 is a diagram of the system embodying the present invention;

Fig. 2 is a fragmentary sectional view of the throttle valve regulator of which a side elevation appears in Fig. 1;

Fig. 3 is a sectional view on line 3—3 of Fig. 1;

Fig. 4 is a fragmentary sectional view showing certain parts of Fig. 2 in a different position;

Fig. 5 is a chart showing the operation of the throttle valve regulator;

Fig. 6 is a fragmentary view showing the pilot's throttle lever and controls associated therewith;

Fig. 7 is a view similar to Fig. 6 showing certain parts in positions differing from what is shown in Fig. 6; and Fig. 8 is a fragmentary sectional view on line 8—8 of Fig. 6.

Referring to Fig. 1, air for the fuel mixture enters through a scoop 10 and passes through a carburetor 11 connected by pipe 12 with an auxiliary supercharger 13 having an impeller 14 and a casing 15 connected by pipe 16 with an engine-stage supercharger 17 having an impeller 18 driven directly by the engine shaft 19 and having a scroll 20 connected with the intake manifold 21 of the engine. The carburetor 11 meters the fuel which is conducted by pipe 22 through a spray nozzle 23 in the pipe 16.

The impeller 14 of the auxiliary supercharger 13 is driven by a shaft 25 connected by gears 26 and 27 and a change-speed mechanism 28 with an engine driven shaft 29. The change-speed mechanism is operated by a lever 30 which is in the low gear position in Fig. 1. When lever 30 is moved clockwise, the change-speed gearing 28 will be shifted into high in order to increase the relative speed of the impeller 14. Movement of the lever 30 is effected by the pilot through a lever 31 and a link 32 connecting said lever with lever 30.

The pressure which is maintained in the manifold 21 is controlled by a throttle valve 40, mounted on a shaft 41 secured to a lever 42 connected by a link 43 with a lever 44 connected by a link 45 with a lever 51 which is a part of the throttle valve regulator 50. Lever 51 is one arm of a differential or floating lever 52 pivotally supported at 53 on a lever 54 fixed to a shaft 55 journalled in a bracket 56 attached to the housing 57 of the controller 50. Shaft 55 is operated by a lever 60 connected by a link 61 with pilot's throttle lever 62. By moving the lever 62 clockwise from the position shown in Fig. 1, the throttle valve 40 may be manually opened to an extent required to make a safe landing in case the controller 50 ceases to function automatically.

For a purpose of automatically controlling the throttle in order to maintain a selected pressure up to critical altitude, controller 50 provides a servomotor which operates through a piston rod 65, link 66, a roller 67 and a cooperating cam 68 provided by the differential lever 52 to effect movements of the throttle valve in addition to those effected manually. The roller 67 is pivotally supported by pin 67a which provides pivotal connection between the link 66 and an arm 69 which is loosely journalled on the shaft 55, thereby limiting the motion of the roller 67 to an arcuate path having its center of curvature at the axis of the shaft 55.

Referring to Fig. 2, the controller housing 57 provides a cylinder 70 receiving a piston 71 connected with the piston rod 65 which slides in a bearing provided by a member 72 which closes the left end of the cylinder and in a bearing 74 provided by a plate 73 which closes the right end of the cylinder. A spring 75 is located between the piston 71 and the member 72 and urges the piston toward the right. Pressure fluid for operating the piston is conducted by piping, not shown, to a duct 76 connected with an annular groove 77 in a valve guide 78 which receives a valve 79 having lands 80 and 81 for controlling ports 82 and 83, respectively, opening into annular grooves 84 and 85, respectively, and connected, respectively, with the ends of the cylinder by passages 86 and 87. Holes 88 connect the groove 77 with the space within the guide 78 and between the lands 80 and 81 of the valve 79. When valve 79 is moved right to connect ports 82 with ports 88, pressure fluid passes through duct 86 to the right end of the cylinder 70 to cause piston 71 to move left; and any pressure fluid at the left of the piston moves out through passage 87, groove 85, ports 83 and the left end of guide 78 and discharges into a chamber 90, which, by passages 91 and 92 is connected with a drain outlet 93 shown in Fig. 1. When valve 79 moves to the left to connect ports 88 and 83, pressure fluid is admitted through passage 87 to the left end of cylinder 50 to cause the piston to move right; and pressure fluid at the right end of the piston moves out through passage 86, groove 84, ports 82 and the right end of guide 78 and discharges into a passage 95 connected in a manner (not shown) with the chamber 90.

Valve 79 is connected by rod 100, clevis 101 and pin 102 with a lever 103 pivotally supported by a pin 104 carried by bridge 105 which connects the adjacent end plates 106 and 107 of flexible metal bellows 108 and 109 respectively. End plate 110 of bellows 108 is supported by a cover plate 111 attached to housing 57 and may be adjusted horizontally by the turning of a tubular screw 112 which can be locked in adjusted position by nut 113. Nut 113 is protected by cover 114 attached by screw 115 which passes through the tubular screw 112 and is threaded into the left end plate 110 of bellows 108. Bellows 108 is evacuated. Bellows 109 has a right end plate of annular form 120 attached to the housing 57 and providing communication between the bellows and a passage 121 connected in a manner (not shown) with a pipe 122 (Fig. 1) which branches from a pipe 123 (Fig. 1) connected with engine manifold 21.

Bellows 108 and 109 have the same exterior area exposed to changes in atmospheric pressure and, since bellows 108 is evacuated, bellows 109 will be effected only by changes in engine intake pressure. Bellows 108 encloses springs 116 and 117 and bellows 109 encloses a spring 118. These springs are so constructed and calibrated that the pivot pin 104 will move in a predetermined manner with respect to changes in engine intake pressure. The relation between the positions of pin 104 and corresponding values of intake pressure is substantially a linear relation.

The servomotor control valve 79 is under joint control by manifold pressure and by a pressure selecting cam 130 against which the upper end of lever 103 is urged by spring 131.

Cam 130 is mounted on a shaft 132 passing through a sleeve 133 (Fig. 3) which is rotatably supported by a bushing 134 and eccentrically of the axis thereof. Bushing 134 is rotatable in a sleeve 135 rotatable in a bearing 136 provided by housing 57. Bushing 134 is connected with a lever 137 and sleeve 135 with a lever 138. Sleeve 133 is fixed to an arm 150 carrying a pin 151 adapted to be engaged by the cam 130. To the sleeve 133 there is attached a lever 152 connected by pin 153 (Fig. 1), link 154, pin 155, lever 155 and shaft 55 with lever 60. Therefore movements of the pilot's control lever 62 from the position shown effect not only the opening of the throttle 40 but also a counterclockwise rotation of the sleeve 133 as viewed in Fig. 2.

As the pin 151 on the arm 150 attached to sleeve 133 moves counterclockwise, cam 130 follows it by reason of the operation of a spring 160 (Fig. 3) having an end 160a engaged by the lever 152 and having an end 160b received by a notch in the right end of shaft 132. Spring 160 is protected by a cover 161 retained on the shaft 132 by a pin 162. Therefore the spring 160 operates to cause the cam 130 to follow the pin 151 in a counterclockwise direction until movement of the cam 130 is stopped by virtue of a pin 163 extending from the cam and striking the right end portion 164 of a rod 165. It will be noted from Fig. 4 that, when pin 163 strikes the rod end 164, counterclockwise motion of the cam 130 is arrested although the pin 151 on arm 150 of sleeve 133 may be moved further in a counterclockwise direction.

When the cam 130 is in the position shown in Fig. 2, the pressure selection is suitable for engine idling. When cam 130 is in the position shown in Fig. 4, the pressure selection is the maximum for engine operation without detonation when no water injection is used. When water injection is functioning, higher manifold pressure is permissible, therefore the cam 130 is permitted to move further in a counterclockwise direction until it strikes the pin 151. In order to permit this movement of cam 130, the rod 165 is caused automatically to move toward the right in response to the functioning of water injection.

The water injection apparatus will now be described with reference to Fig. 1. A tank 170 contains a supply of alcohol-water mixture which is under pressure by virtue of the connection of the tank through a spring loaded valve 171 with the pressure pipe 123. The tank outlet 172 is controlled by a valve 173 urged into closed position by a spring 174. Valve 173 is opened by a solenoid comprising an armature 175 connected with the valve and a coil 176 which is energized by current from a battery 177 by the closing of certain switches. Coil 176 is connected with a contact blade 178 carrying a contact 179 adapted to engage a contact 180 connected with a spring blade 181 which carries a contact 182 for engaging a contact 183 connected with the battery 177. Coil 176 is energized when contacts 179, 180 and contacts 182, 183 are closed. Contacts 179, 180 are closed by counterclockwise movement of a cam 178a operated by shaft 55 when lever 62 is moved into certain high pressure selecting positions. Cam 178a engages a follower 178b on contact blade 178. Contacts 182, 183 are closed due to the resiliency of blade 181 when such action is permitted by means which responds to the flow of alcohol-water mixture into the air passage 12.

In order that the initiation of the functioning of the water injection may be effected, the switch contacts 182, 183 are temporarily by-passed by a manually operated switch comprising a contact 185 for bridging contacts 186, 187. When contact 185 is released, a spring 188 returns it to open position. Therefore to start the operation of the water injection, contact 185 is pressed into engagement with contacts 186 and 187 and the lever 62 is moved into position for selecting pressures which are safe for engine operation with water injection, thereby closing contacts 179 and 180. The solenoid coil 176 is energized and the valve 173 opens. The injection fluid flows under pressure through a pipe 190 and pipe 191 to a cylinder 192 in which is located a loosely fitted piston 193 normally urged by spring 194 against a flange 195. The piston 193 is provided with a stem 196 extending through a packed bearing 197 and engageable with a non-conducting block 198 attached to the blade 181. The piston stem provides passages 200 and 201 which so restrict the flow of the injection fluid that the pressure in the right end of the piston overcomes the spring 194 and the piston 193 moves left to allow some of the injection fluid to pass around it as well as through it and into a pipe 202 terminating in a spray nozzle 203 within the air duct 12. So long as the injection fluid is flowing from the nozzle 203, the switch contacts 182, 183 will be closed. Therefore the valve 173 will be maintained open.

While the injection fluid is flowing from the nozzle 203, it is necessary that the cam 130 be permitted to move to a position of high pressure selection in order to take advantage of the water injection. Therefore means are provided for automatically moving the rod 165 toward the right of the positions shown in Figs. 1 and 4 in response to the flow of injection fluid. Rod 165 slides through a bushing 210 threadedly attached to the cover plate 111 (Fig. 2) and secured there in a desired position by a nut 211. Bushing 210 is attached to a metal cup 212 which supports an end cover 213 which provides the fixed end of a metal bellows 214 having its movable end provided by a cup-shaped member 215 attached to rod 165 and provided with an annular flange 216 which is normally caused to bear against the cover 213 by a spring 217. A hole 218 in cover 213 provides for connecting the interior of bellows 214 with a pipe 219 connected with pipe 190. While the fluid injection apparatus is not functioning, the spring 217 maintains the rod 165 in such position that its right end 164 is engaged by the pin 163 of cam 130 as shown in Fig. 4. In response to the flow of pressure fluid through the pipe 190 to the nozzle 203, the bellows 214, being acted upon by the pressure of this fluid, overcomes the spring 217 and causes the rod 165 to move toward the right from the position shown in Fig. 4 in order to permit the cam 130 to move under the action of spring 160 until it strikes the pin 151 thereby placing the cam 130 in that position of high pressure selection which will take advantage of water injection.

When the supply of injection fluid is exhausted, the spring 194 returns the piston stem 196 into the position shown thereby opening contacts 182 and 183 which renders the solenoid coil 176 ineffective so that the spring 174 will return the valve 173 to closed position. Concurrently therewith, the spring 217 (Fig. 2) returns the rod 165 to the position shown, thereby causing the cam 130 to be moved clockwise into a position of pressure selection which is safe for engine operation without water injection.

If there should be any substantial decrease in the rate of flow of injection fluid from the nozzle 203 due to a partial stoppage in the nozzle or in the pipe 202, pressure will build up in the cylinder 192 at the left of the pipe 193, thereby causing the piston to return to the position shown in Fig. 1, thereby causing contacts 182 and 183 to open and the solenoid coil 176 to become deenergized and the valve 173 will close. Since pipe 190 is disconnected from the fluid under pressure in the tank 170, the pressure in pipes 190 and 219 will diminish as the injection fluid may still flow through the pipe 202 and nozzle 203. As the pressure acted upon the bellows 214 (Fig. 2) diminishes, the spring 217 becomes effective to return the rod 165 to normal position in order to decrease the pressure selection.

The curves of Fig. 5 are based on movement of lever 60 in degrees and throttle opening in degrees or manifold pressure in inches of mercury absolute. Line O—P represents manually effected throttle opening movements for various positions of lever 60. Line Q—R—S represents total movement of the throttle as effected manually by the lever 62 and automatically by the servomotor. The mechanical connections between the servomotor and the throttle, including the variable connection provided by the roller 67 and the cam slot 68, are such that, throughout the range of pressure selection corresponding to the position of lever 60 from the 30° to the 85° position, the throttle will be substantially wide open at critical altitude as indicated by the horizontal line R—S. Line A—B represents manifold pressures corresponding to positions of lever 60 from 0° to 70° when the auxiliary stage supercharger is operating at relatively low speed. When the change-speed gearing 28 is shifted into high gear in order to effect operation of the auxiliary supercharger at high speed, the pressures obtainable by movement of lever 60 between the 30° and 70° positions are represented by line D—E. When fluid injection is operating and lever 60 moves between the 70° and 85° positions, the pressures are indicated by line B—G with the auxiliary supercharger in low gear; and, when in high gear, the pressures are those indicated by line E—H. When fluid injection ceases to function due to exhaustion of the injection fluid or to substantial decrease in the rate of flow from the nozzle 203, the pressures which are obtainable, when lever 60 moves between 70° and 85° positions, are represented by B—C for low speed operation of the auxiliary supercharger, and by line E—F for high speed operation thereof.

The raising of pressure from a value represented by a point on line A—B to a value represented by a point on line D—E or from a value represented by a point on line B—G to a value represented by a point on line E—H is effected, without change in the position of lever 60, when the lever 31 is moved so as to shift the change speed gearing from low to high. This shifting is effected by clockwise rotation of eccentric bearing 134 whose axis is represented by the dot 134a in Fig. 1. Lever 137, to which eccentric bearing 134 is attached, is urged clockwise by spring 140 attached at one end to lever 137 and at the other to a bracket 141 attached by screws 142 to the cover plate 111. Lever 137 has an ear 143 for engaging the lever 138 which, as stated before, is attached to sleeve 135 which is coaxial with the eccentric bearing 134. Lever 138 is connected by link 144, with gear shift control lever 31. When lever 31 is moved clockwise, to move the gear shift lever 30 to the high position, lever 138 is moved into position 138a (Fig. 1). Lever 137 moves under the action of spring 145 as lever 138 moves into position 138a. The cam 130 is shifted to the left to cause increase of pressure selection. Conversely, when lever 31 is moved back into the position shown, gear shift lever 30 is moved to the low gear position and lever 138 moves from 138a back to the normal position as shown in Fig. 1. Consequently, lever 137 and cam 132 are moved back to normal position to reduce the selected pressure.

The lever 137 may be moved to normal position independently of the return of lever 31 to normal position by means which operates in response to movement of lever 60 to certain low pressure selecting positions. For example, when lever 60 is in the position shown in Fig. 1 which is in the position for selecting the lowest pressure suitable for engine idling, lever 152 is located in the position shown in Fig. 1 and a cam surface 152a provided by the hub of this lever engages a roller 152b pivotally supported by the controller housing 57. Therefore independently of the restoration of the change speed gearing 28 to low gear status, the pressure selection will be reduced automatically to some value represented by a point A on line A—B. Therefore the manifold pressure for engine idling will not be excessive although the change speed gearing may remain in high gear.

Referring to Fig. 6 which shows a modified form of control of the solenoid 176, there is a cam 220 provided by a lever 221 pivoted at 222 upon one of two arcuate bars 223 which guide the lever 62 which is supported by a shaft 225. Lever 62 has a recess 226 for receiving a spring 227 which engages a bar 228 and urges it downwardly into engagement with the bars 223 so as to retain the lever 62 frictionally in a desired position. Lever 62 is shown in Fig. 6 in the position corresponding to the 70° position of the lever 60 of the controller 50 (Fig. 1). When lever 62 is moved clockwise beyond the position shown in Fig. 6 to a position such as shown in Fig. 7 for the purpose of causing the controller 50 to select a pressure which is permissible when liquid injection is used, the bar 228 engages the cam 220 to cause the bar 221 to move from the position shown in Fig. 6 to that shown in Fig. 7, and to effect movements of the switches which control the operation of the water injection apparatus.

When bar 221 moves downwardly it causes a bar 230 supported by guides 231 and 232 to move downwardly against the action of a spring 233. Movement of lever 220 is limited by providing a slot 221a in the lever for receiving a pin 221b attached to bar 223. The bar 230 carries a pin 235 for supporting a pawl 236 urged by a spring 237 against a stop 238. During downward movement of bar 230, pawl 236 engages a roller 240 pivoted at 241 on a rod 242 supported by a guide 243. The rod 242 extends through a spring 245 located between a shoulder 244 of the rod and a fixed part 246. Rod 242 insulatingly supports a flexible contact 185' which is the equivalent of contact 185 in Fig. 1. Contact 185' is adapted to engage contacts 186' and 187'. Rod 242 supports a latch bar 247 engageable with a latch hook 248 carried by bi-metallic blade 249 surrounded by heater coil 250 connected with the battery 177 and with contact 185'.

Below the bar 230 there is located a switch comprising engageable contacts 179' and 180' mounted on resilient blades 181' and 178' respectively. Blade 181' carries non-conducting button 251 to be engaged by the lower end of rod 230.

Clockwise movement of lever 62 from the position shown in Fig. 6 causes the lever 221 and the bar 230 to move down into the positions shown in Fig. 7. During downward movement of rod 230, the pawl 236 engages the roller 240 and causes the rod 242 to move toward the right so that the contact 185' engages the contacts 186' and 187' and the latch bar 247 moves to the right of the hook 248 to retain the rod 242 in the position shown in Fig. 6. Downward movement of bar 230 causes contact 180' to engage the contact 179'. The solenoid 176 is energized and the valve 173 is opened. The liquid injection apparatus starts operating and the switch contacts 182 and 183 close as stated heretofore.

When contact 185' engages contacts 186' and 187', the battery 177 is connected with the heater coil 250 which increases the temperature of the bi-metal blade 249 which is so constructed that increase of temperature tends to cause the latch hook 248 to move upwardly. After a time which is sufficient for the automatic closing of contacts 182 and 183, the latch hook 248 has moved sufficiently to release the latch bar 247. Then the spring 245 returns the rod 242 to the position shown in Fig. 6 thereby disengaging contact 185' from contacts 186' and 187'. The bar 230 is still down as shown in Fig. 7; and the returned position of the roller 240 is indicated by the dot-dash circle 240'. Roller 240 is above the lower end of the pawl 236 instead of being below it as shown in Fig. 6. Counterclockwise movement of lever 62 from a position such as shown in Fig. 7 into or past the position shown in Fig. 6, results in upward movement of the lever 221 and the bar 230 into the positions shown in Fig. 6 under the action of spring 233. There is no re-engagement of the switch contact 185' with contacts 186' and 187' during upward movement of rod 230. The pawl 236 merely rides on the roller 240 as the pawl returns to the position shown in Fig. 6 without causing any movement of the rod 242 toward the right. Therefore return of bar 230 by spring 233 is not materially impeded by contact of pawl 236 with roller 240.

While the embodiment of the present invention as herein disclosed, constitutes a preferred form, it is to be understood that other forms might be adopted, all coming within the scope of the claims which follow.

What is claimed is as follows:

1. A system of control for the intake pressure of a supercharged internal combustion engine comprising the combination, with the air or fuel-mixture conduit of the engine having a throttle valve, of a manually operable throttle valve controlling member, means for controlling the speed of an engine supercharger, a manually operable member for adjusting the speed control means, and a controller having means for adjusting the throttle valve to maintain a selected pressure and means under the joint control of both manually operable members for selecting the pressure to be maintained.

2. A system of control for the intake pressure of a supercharged internal combustion engine comprising the combination, with the air or fuel-mixture conduit of the engine having a throttle valve, of a manually operable throttle valve controlling member, means for controlling the speed of an engine supercharger, a manually operable member for adjusting the speed control means, liquid injection apparatus, and a controller having means for adjusting the throttle valve to maintain a selected pressure and means under the joint control of both manually operable members and liquid injection apparatus for selecting the pressure to be maintained.

3. A system of control for the intake pressure of a supercharged internal combustion engine comprising the combination, with the air or fuel-mixture conduit of the engine having a throttle valve, of a manually operable throttle valve controlling member, means for controlling the speed of an engine supercharger, a manually operable member for adjusting the speed control means, liquid injection apparatus, and a controller having means for adjusting the throttle valve to maintain a selected pressure and a pressure selecting cam, means including a spring for transmitting motion from the throttle valve controlling member to the cam, means operated by the speed adjusting member for laterally shifting the cam, a stop normally operative to limit movement of the cam in response to movement of the motion transmitting spring, and means responsive to the functioning of the liquid injection apparatus for retracting the stop.

4. A system of control for the intake pressure of a supercharged internal combustion engine comprising the combination, with the air or fuel-mixture conduit of the engine having a throttle valve, of a manually operable throttle valve controlling member, and a controller having means for adjusting the throttle valve to maintain a selected pressure and a pressure selecting cam, means including a spring for transmitting motion from the throttle valve controlling member to the cam, a stop normally operative to limit movement of the cam in response to movement of the motion transmitting spring, liquid injection apparatus, and means responsive to the functioning of the liquid injection apparatus for retracting the stop.

5. A system of control for the intake pressure of a supercharged internal combustion engine comprising the combination, with the air or fuel-mixture conduit of the engine having a throttle valve, of a manually operable throttle valve controlling member, means for controlling the speed of an engine supercharger, a manually operable member for adjusting the speed control means, liquid injection apparatus, and a controller having means for adjusting the throttle valve to maintain a selected pressure and a pressure selecting cam, a rotary shaft supporting the cam, a second shaft eccentrically supporting the cam shaft, means including a spring for transmitting motion from the throttle valve controlling member to the cam, means operated by the speed adjusting member for rotating the second shaft, a stop normally operative to limit movement of the cam in response to movement of the motion transmitting spring, liquid injection apparatus, and means responsive to the functioning of the liquid injection apparatus for retracting the stop.

6. A system of control for the intake pressure of a supercharged internal combustion engine comprising the combination, with the air or fuel-mixture conduit of the engine having a throttle valve, of a manually operable throttle valve controlling member, and a controller having means for adjusting the throttle valve to maintain a selected pressure and a pressure selecting cam, a rotary shaft supporting the cam, means including a spring for transmitting motion from the throttle valve controlling member to the cam, a stop normally operative to limit movement of the cam in response to movement of the motion transmitting spring, liquid injection apparatus, and means responsive to the functioning of the liquid injection apparatus for retracting the stop.

7. A system of control for the intake pressure of a supercharged internal combustion engine comprising the combination, with the air or fuel-mixture conduit of the engine having a throttle valve, of a manually operable throttle valve controlling member, liquid injection apparatus, a controller having means for adjusting the throttle valve to maintain a selected pressure and means under joint control by the valve controlling member and by the liquid injection apparatus for selecting a pressure to be maintained, and means responsive to a movement of the valve controlling member into a position for selecting a pressure in a certain range for effecting operation of the liquid injection apparatus.

8. A system of control for the intake pressure of a supercharged internal combustion engine comprising the combination, with the air or fuel-mixture conduit of the engine having a throttle valve, of a manually operable throttle valve controlling member, liquid injection apparatus, a controller having means for adjusting the throttle valve to maintain a selected pressure and means under joint control by the valve controlling member and by the liquid injection apparatus for selecting a pressure to be maintained, means responsive to a movement of the valve controlling member into a position for selecting a pressure in a certain range for effecting operation of the liquid injection apparatus, and means responsive to diminution of flow of injection liquid for discontinuing operation of the liquid injection apparatus.

9. A system of control for the intake pressure of a supercharged internal combustion engine comprising the combination, with the air or fuel-mixture conduit of the engine having a throttle valve, of a manually operable throttle valve controlling member, liquid injection apparatus, means for initiating operation of the apparatus including a first device and a second device concurrently operated, means for maintaining operation of the apparatus including said second device and a third device concurrently operated, said third device functioning in response to proper flow of the injection liquid, an element movable in response to proper flow of the injection fluid, a controller having means for adjusting the throttle valve to maintain a selected pressure and means under joint control by the valve controlling member and by said element, and mechanisms responsive to a movement of the throttle valve controlling member into a position for selecting a pressure in a certain range for causing a temporary functioning of the first device and for causing the second device to function so long as the throttle valve controlling member is in a position for selecting a pressure in a certain range.

10. A system of control for the intake pressure of a supercharged internal combustion engine comprising the combination, with the air or fuel-mixture conduit of the engine having a throttle valve, of a manually operable throttle valve controlling member, liquid injection apparatus comprising a liquid tank under fluid pressure, a nozzle in the engine conduit, a duct connecting the tank and nozzle, a normally closed valve in the duct, an electromagnet for opening the valve, a current source, a series circuit including the current source, a first normally open switch and a second normally open switch, a third normally open switch in shunt with the first switch, means for closing the third switch in response to proper flow of injection fluid, an element movable in response to proper flow of injection fluid, a controller having means for adjusting the throttle valve to maintain a selected pressure, and means under joint control by the valve controlling member and by said element, and mechanisms responsive to a movement of the valve controlling member into a position for selecting a pressure in a certain range for effecting concurrently the temporary closing of the first switch and a closing of the second switch so long as the throttle valve controlling member is in a position for selecting a pressure in a certain range.

11. A system of control for the intake pressure of a supercharged internal combustion engine comprising the combination, with the air or fuel-mixture conduit of the engine having a throttle valve, of a manually operable throttle valve controlling member, liquid injection apparatus comprising a liquid tank under fluid pressure, a nozzle in the engine conduit, a duct connecting the tank and nozzle, a normally closed valve in the duct, an electromagnet for opening the valve, a current source, a series circuit including the current source, a first normally open switch and a second normally open switch, a third normally open switch in shunt with the first switch, means for closing the third switch in response to proper flow of injection fluid, an element movable in response to proper flow of injection fluid, a controller having means for adjusting the throttle valve to maintain a selected pressure and means under joint control by the valve controlling member and by said element, an actuator movable in response to movement of the throttle valve controlling member into a certain range of positions for the selection of a certain range of pressures for closing the second switch and for effecting a closing movement of the first switch during the movement of the actuator while providing for release of the switch at the end of movement of the actuator, a spring tending to open the first switch, a latch for retaining the first switch in closed position when closed by the actuator, and means for retracting the latch after the lapse of time during which the third switch is closed by operation of the liquid injection apparatus.

12. A system of control for the intake pressure of a supercharged internal combustion engine comprising the combination, with the air or fuel-mixture conduit of the engine having a throttle valve, of a manually operable throttle valve controlling member, liquid injection apparatus comprising a source of injection liquid under pressure, a nozzle in the engine conduit, a duct connecting the source and nozzle, a normally closed valve in the duct, an electromagnet for opening the valve, a current source, means for maintaining a circuit between the current source and the electromagnet and comprising a manually closed switch and a switch provided with means for closing it so long as proper flow of injection fluid is maintained, means for establishing a circuit for initiating the operation of the magnet and comprising the first manually closed switch and another manually closed switch for by-passing the switch closed in response to proper flow of injection fluid, an element movable in response to proper flow of injection fluid, and a controller having means for adjusting the throttle valve to maintain a selected pressure and means under joint control by the valve controlling member and by said element.

CLARENCE H. JORGENSEN.
WILLIAM H. TAYLOR.
FREDERICK J. HARDMAN.

REFERENCES CITED

The following references are of record in the file of this patent:

UNITED STATES PATENTS

| Number | Name | Date |
| --- | --- | --- |
| 2,031,527 | Dodson | Feb. 18, 1936 |
| 2,217,364 | Halford et al. | Oct. 8, 1940 |
| 2,228,239 | Ammann | Jan. 14, 1941 |
| 2,392,565 | Anderson et al. | Jan. 8, 1946 |